Nov. 1, 1966 F. T. PARO 3,282,623
EXTENSIBLE SUN VISOR
Filed Sept. 21, 1964
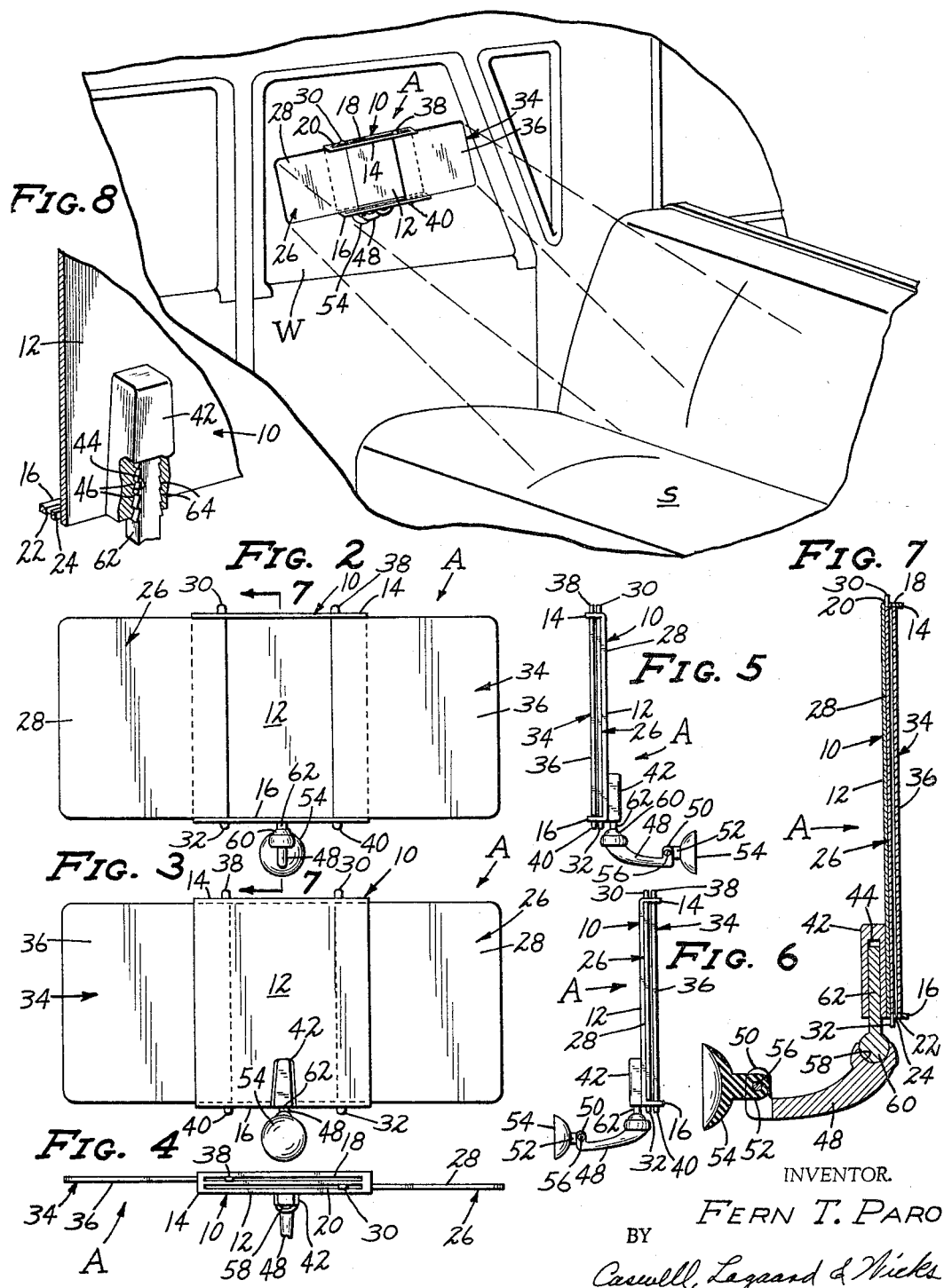
INVENTOR.
FERN T. PARO
BY
Caswell, Legrand & Wicks
ATTORNEYS 3,282,623
EXTENSIBLE SUN VISOR
Fern T. Paro, 59 Davis Drive, Silver Bay, Minn.
Filed Sept. 21, 1964, Ser. No. 397,778
2 Claims. (Cl. 296—97)

The invention relates to a sun shade and more particularly to a sun shade mountable on the inside of a window of an automobile for shading an occupant thereof from the sun, particularly in the case of an infant where the positioning of the shade is much more critical than with an adult.

It is an object of the invention to provide a sun shade which mounts on the window of an automobile, which is angularly adjustable, which is adjustable in length and which is opaque. With the adjustability and the opaque nature, the sun shade can produce a positive area of shadow at a multitude of positions as required.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of the shade shown in operative position on the inside of a window of an automobile.

FIGURE 2 is a top plan view of the shade.

FIGURE 3 is a bottom plan view of the shade.

FIGURE 4 is a longitudinal edge view thereof.

FIGURE 5 is an end view of the shade.

FIGURE 6 is an end view opposite to that shown in FIGURE 5.

FIGURE 7 is a sectional view on the line 7—7 of FIGURE 2.

FIGURE 8 is a fragmentary view showing in detail the connection of the support arm to the hanger base member.

Referring to the drawings in detail, the sun shade A includes the central support member 10 which includes the flat opaque base portion 12. Formed on the outer edges of the base 12 are the upper and lower flanges 14 and 16, respectively, which are disposed at a ninety degree angle to the base 12. The upper flange 14 is formed with two parallelly disposed spaced slots 18 and 20 extending therethrough. Similarly the lower flange 16 is formed with two parallelly disposed spaced slots 22 and 24 extending therethrough.

The numeral 26 designates a first extension member including a flat opaque body 28 and extending from the upper and lower edges thereof at the inner end are the small tabs 30 and 32, respectively. The tab 30 extends through and outwardly of the slot 20 of the flange 14 while the tab 32 extends through and outwardly of the slot 24 of the flange 16. The tabs 30 and 32 are slidable in the slots 20 and 24, respectively, whereby the extension 26 is adjustably positioned on the central support 10 to give maximum length to the shade or a telescoped condition with the extension 26 slidably moved to a position where it is substantially in alignment with the base 12 for storage and compactness.

The numeral 34 designates a second extension member including a flat opaque body 36 and extending from the upper and lower edges thereof at the inner end are the small tabs 38 and 40, respectively. The tab 38 extends through and outwardly of the slot 18 of the flange 14 while the tab 40 extends through and outwardly of the slot 22 of the flange 16. The tabs 38 and 40 are slidable in the slots 18 and 22, respectively, whereby the extension 34 is adjustably positioned on the central support 10 to give maximum length to the shade or a telescoped condition with the extension 34 slidably moved to a position where it is substantially in alignment with the base 12 and the extension 28 when it is also moved to a position upon the base for storage and compactness.

The extensions 26 and 34 have a dimensional width only slightly less than the distance between the flanges 14 and 16 whereby the extensions are slidably secured between the flanges with the tabs of the extensions in the slots of the flanges as heretofore described. The various tabs frictionally engage the edges of the slots whereby the extensions remain in the position in which the same are placed.

Further provided is a hanger base member 42 which is secured to the undersurface of the flat base portion 12. The hanger base member 42 has formed therein the slot 44 and the side walls of which are formed with the teeth-like serrations 46. The numeral 48 designates a hanger having a bifurcated end 50 in which the projection 52 of the rubber suction cup 54 extends. The projection 52 is secured within the bifurcated end 50 by means of the pin 56. The hanger member 48 also includes the socket 58 formed on the outer free end thereof in which is positioned the ball 60 to which is secured the arm 62 which is formed with teeth-like serrations 64. The arm 62 is connected to the hanger base member 42 by forcing the toothed arm 62 into the toothed-like formations formed in the slot 44 whereby the arm 62 cannot be removed and is fixedly secured to the hanger base member 42. As a result, the base portion 12 of the sun shade A together with its extensions 26 and 34 is adjustably connected to the suction cup 54.

As an example of use of the sun shade A, the suction cup is mounted on the window W, as shown in FIG. 1, with the sun shade A in line with the window whereby the sun's rays may be blotted out and a shadow projected upon the car seat S in practically any desired place thereon. As heretofore pointed out, the base portion 12 and the extensions 26 and 34 are opaque whereby the shadow that is cast by the sun shade is positive. An infant, for example, lying on the seat S may be positively and completely shaded by reason of the sun shade A. The sun shade A may be placed in different attitudes by means of the pivoting features at the pin 56 and also further positioning may be accomplished by movement of the ball member 60 in the socket member 58. Further, the extension 26 and 34 may be extended to the degree necessary in a given situation.

The invention is not to be understood as restricted to the deails set forth since these may be modified within the scope of the appended claims without departing from the spirit and scope of the invention.

Having thus described the invention what is claimed as new and desired to be secured by Letters Patent is:

1. A sunshade comprising:
   (a) a flat central rectangular opaque base member having
   (b) a first flange extending along one edge thereof at a right angle thereto and
   (c) a second flange extending at a right angle from said base along an edge opposite said first flange,
   (d) each of said first and second flanges having parallelly disposed first and second slots formed therein,
   (e) a first flat opaque extension member having
   (f) a tab member extending from each of two opposed edges thereof and extending through said first slot of said first and second flanges,
   (g) a second flat opaque extension member having
   (h) a tab member extending from each of two opposed edges thereof and extending through said second slot of said first and second flanges,
(i) a hanger member having a pivotal connection with said central base member, and
(j) means for mounting said hanger member on a support.

2. A sunshade comprising:
(a) a flat rectangular opaque base member having,
(b) a first flange extending along one edge thereof and
(c) a second flange extending along an edge opposite said first flange,
(d) each of said first and second flanges having a slot formed therein,
(e) a flat opaque extension member having
(f) a pair of tab members extending from opposed edges of said extension member and extending through said slots of said flanges thereby slidably mounting said extension on said base member,
(g) a hanger member pivotally mounted on said member, and (h) means for mounting said hanger member on a support.

References Cited by the Examiner
UNITED STATES PATENTS

| | | | |
|---|---|---|---|
| 1,953,877 | 4/1934 | Chase | 296—97 |
| 2,596,873 | 5/1952 | Solmes | 296—97 |
| 2,733,763 | 2/1956 | Nygaard | 296—97 |
| 2,948,566 | 8/1960 | Massey | 296—97 |

BENJAMIN HERSH, *Primary Examiner.*

J. A. PEKAR, *Assistant Examiner.*